Feb. 16, 1926.                                          1,573,703
                        F. H. GRIFFIN
        RECOVERY OF CAUSTIC HYDROXIDES FROM WASTE SOLUTIONS
                Filed June 27, 1923        2 Sheets-Sheet 1
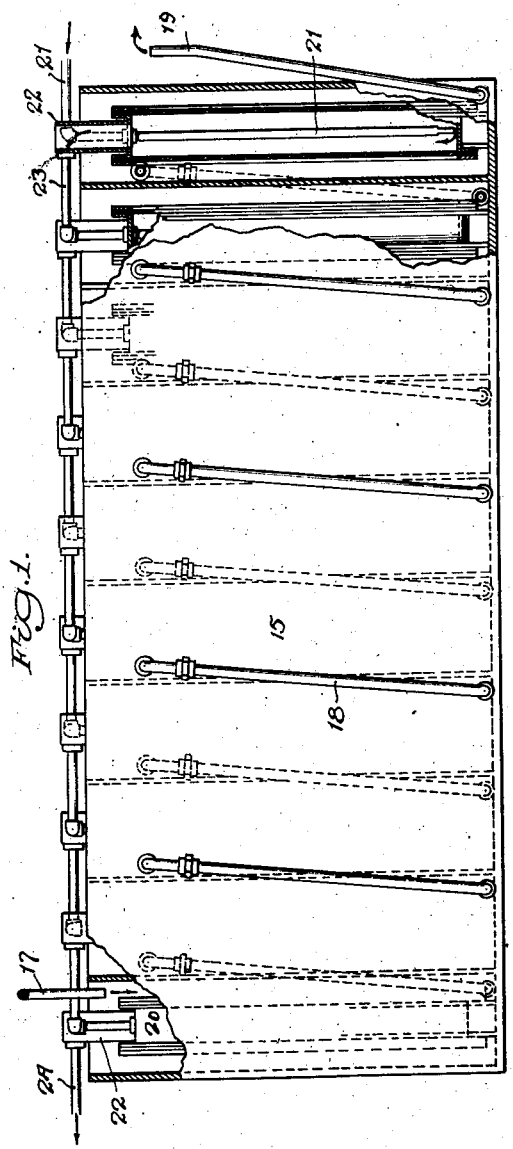
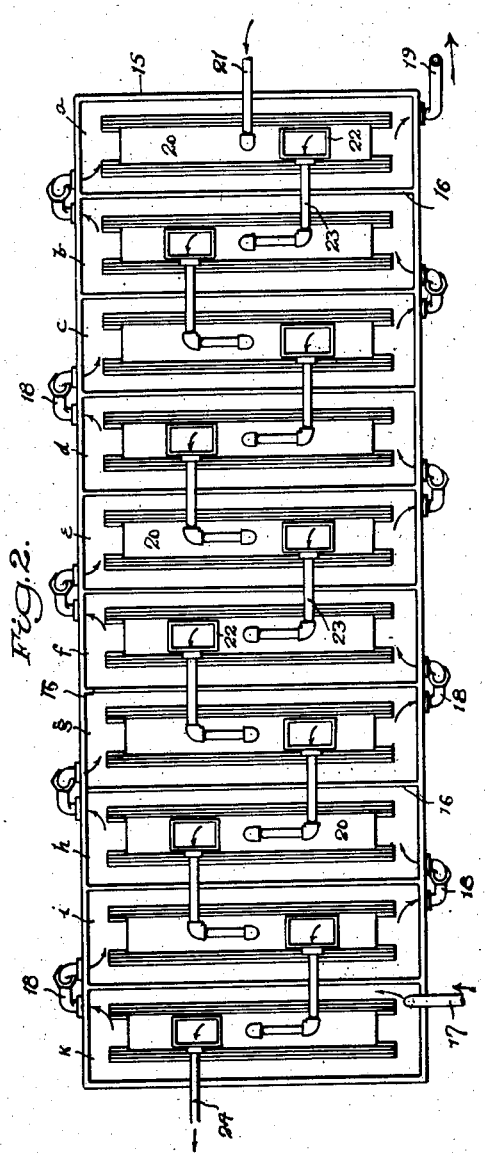
INVENTOR
FRANK H. GRIFFIN
BY
ATTORNEYS

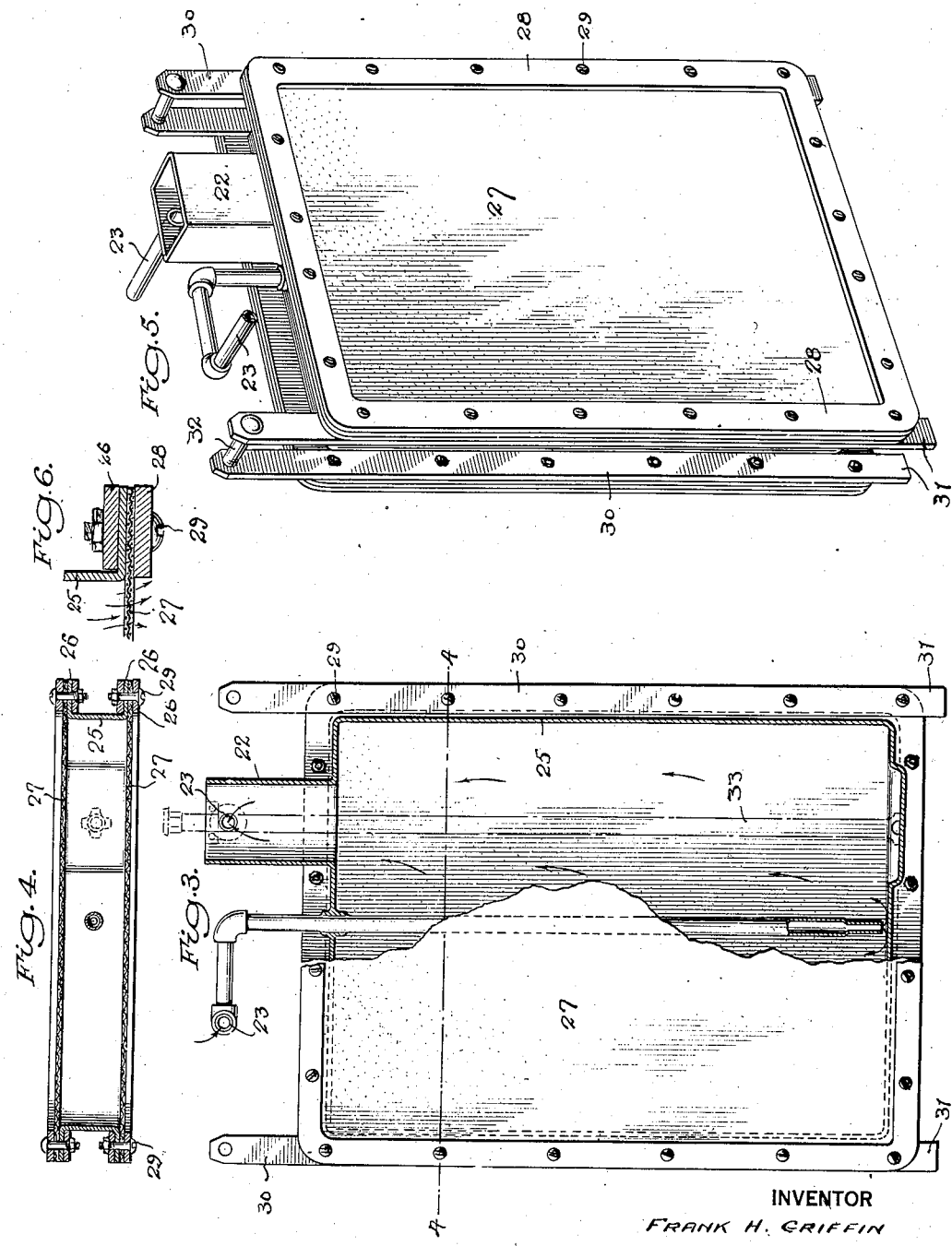

Patented Feb. 16, 1926.

1,573,703

UNITED STATES PATENT OFFICE.

FRANK H. GRIFFIN, OF WAWA, PENNSYLVANIA, ASSIGNOR TO THE VISCOSE COMPANY, OF MARCUS HOOK, PENNSYLVANIA, A CORPORATION OF PENNSYLVANIA.

RECOVERY OF CAUSTIC HYDROXIDES FROM WASTE SOLUTIONS.

Application filed June 27, 1923. Serial No. 648,032.

*To all whom it may concern:*

Be it known that I, FRANK H. GRIFFIN, a citizen of the United States of America, residing at Wawa, in the county of Delaware and State of Pennsylvania, have invented certain new and useful Improvements in Recovery of Caustic Hydroxides from Waste Solutions, of which the following is a specification.

My invention relates to improvements in the recovery of caustic hydoxides from waste solutions, such as the liquor that results from the so-called steeping operation in the artificial silk industry, waste caustic liquors from the mercerization of yarns, and the so-called black liquor from the digestors of pulp mills using the caustic method of cooking.

My invention contemplates the dialytic separation of the caustic hydroxides from impurities, such as hemi-celluloses, hydroxy-celluloses, oxy-celluloses and other substances organic or inorganic, which are contained in the waste liquors either in solution, or in flocculent, jelly-like or colloidal condition.

My invention furthermore embraces appropriate apparatus for carrying out the method and is shown in one form in the accompanying drawings, in which—

Fig. 1 is a broken side elevation of a series of inter-connected tanks and associated dialytic cells;

Fig. 2 is a plan view thereof;

Fig. 3 is a broken side elevation of one of the dialytic cells alone, drawn to a larger scale;

Fig. 4 is a section on the line 4—4, Fig. 3;

Fig. 5 is a perspective of the cell shown in Fig. 4; and

Fig. 6 is an enlarged cross section of a detail.

Although diffusion or dialytic methods have long been known they have never been practically applied to the recovery of values from waste caustic solutions, so far as I am aware. In the art to which my invention relates, the general practice employed to recover the alkali from the spent liquors is to evaporate the liquor, followed by the removal of the organic impurities by incineration or carbonization, or by some chemical treatment. My invention provides a practical method and apparatus by which the caustic alkali may be recovered from the liquor by dialysis.

Briefly, the method consists in supplying the impure liquor to a dialytic cell, some or all of the walls of which are of semi-permeable membrane, the cell being immersed in a solvent for the caustic, such as water, either pure or weakly caustic. The caustic hydroxides of the waste liquor diffuses through the membrane and is taken up by the water, but the organic impurities remain within the dialytic cell. While I prefer to employ a plurality of water chambers and associated dialytic cells, and to continuously flow the waste liquor through the several cells counter-current to the flow of water through the several compartments, both in series, the invention is not so limited. The cells may be worked separately or in pairs, and they may be intermittently charged and discharged, if preferred. It is more satisfactory, however, to employ the counter-flow principle for which the apparatus shown in the drawings is designed.

Referring to the drawings, I have here shown a tank 15 sub-divided by partitions 16 into a series of independent compartments $a, b, c, d, e, f, g, h, i, k$. A pipe 17 delivers to the upper portion of the compartment $k$ at one end of the series. From the bottom of this compartment connection is made by a pipe 18 to the upper portion of the adjacent compartment $i$. Preferably the outlet pipe 18 is at the opposite end of the compartment from the inlet pipe 17, as well as at the bottom thereof, while the inlet is at the top. Similar connections by pipes 18 establish the flow of the water through the several compartments in series, the escape pipe 19 leading to any appropriate receiving tank, not shown.

Within each of the several compartments $a$ to $k$ is arranged a dialytic cell 20 suitably spaced from the bottom and side walls of the compartment to allow of the free circulation of the water around the cell. The impure caustic solution is introduced to the cell in compartment $a$ through the pipe 21, which extends downward within the cell and discharges adjacent the bottom thereof as indicated. At the top of the cell is a hood 22, to which connection is made by the outlet pipe 23 leading to the cell in the adjacent chamber *b* from which in turn the liquor passes to the next cell in series, and is finally discharged from the cell in compartment *k* through the outlet 24. Since the specific gravity of the liquor diminishes as it gradually loses its caustic to the water by dialysis in the successive compartments through which it passes, the hoods 22 or their equivalents are desirable in order to compensate this loss of weight and to provide the necessary "head" which causes the liquor to flow from cell to cell. It will be noted that the level of the liquor in the hoods is above that of the water in the surrounding compartments.

By properly regulating the supply of waste liquor entering at 21 and discharging at 24, and also the flow of the water entering at 17 and discharging at 19, the strength of the pure caustic solution which discharges from the pipe 19 may be controlled. The invention is not limited to the recovery of caustic liquors of any definite strength, although the maximum strength of the recovered caustic depends upon the caustic strength of the waste liquor, the manner in which the cells are coupled, and the rate of flow through the cells and tank compartments.

A satisfactory construction of one of the cells is indicated in Figs. 3 to 6. As here shown each cell comprises an open sided metal body 25, having at its upper end a hood 22 and provided at its margins with out-turned flanges 26. The permeable membranes 27 which form the side walls of the cell are clamped to opposite sides of the metal body 25 by frame plates 28 bolted to the flanges 26. Vertical bars 30 may also be secured thereto, the lower ends of which project below the bottom of the cell and form supporting feet 31 which rest upon the bottom of the compartment. Cross pins 32 at the heads of the bars 30 afford convenient hand holds during the assembly and dissassembly of the parts.

In order to clean the cells of sediment, pipes 33 (Fig. 3) may be introduced through the hood to the cell bottoms, and a suction connection made to the top of the pipe.

The diaphragms 27 may be of any suitable character, but I have found that durability and efficiency are best obtained by the use of parchmentized woven fabrics. Such membranes may be prepared by immersing cotton sheeting in sulfuric acid of specific gravity of 1.10 at a temperature of less than 30° C. for two minutes, followed by the removal of the excess acid either by neutralization or water-washing.

While the apparatus shown is efficient for the carrying out of my method, various other layouts will readily occur to those skilled in the art, which embody the underlying thoughts which I claim as my invention.

I claim—

1. Dialytic apparatus, comprising a series of compartments, means for flowing a solvent therethrough in one direction in series, in combination with a corresponding series of dialytic cells arranged in said compartments, and means for flowing the impure solution therethrough counter-current to the solvent, said cells having associated means for compensating the varying specific gravity of the impure solution as it passes through the series of cells.

2. Dialytic apparatus, comprising a series of compartments, means for flowing a solvent therethrough in one direction in series, in combination with a corresponding series of dialytic cells arranged in said compartments, and means for flowing the impure solution therethrough counter-current to the solvent, said cells having associated hoods in which the solution rises above the level of the liquid in the surrounding chamber.

3. Dialytic apparatus, comprising a series of compartments, means for flowing a solvent therethrough in one direction in series, in combination with a coresponding series of dialytic cells arranged in said compartments, and means for flowing the impure solution therethrough counter-current to the solvent, each of said cells having associated means for maintaining the necessary head to insure the flow of the impure solution through the cell series regardless of its decreasing specific gravity as it advances.

4. In dialytic apparatus, a cell comprising a chamber having a dialytic wall, and a bonnet at the top of the cell communicating with said chamber.

5. In dialytic apparatus, a cell comprising a chamber having a dialytic wall, and a bonnet at the top of the cell communicating with said chamber, a port in said bonnet and a conduit passing down through the chamber and opening adjacent the bottom of the latter.

6. In dialytic apparatus, a cell comprising a skeleton frame having continuous side flanges, dialytic membranes lying against said flanges, clamping members registering with said flanges, and means for detachably securing said clamping members to the flanges to hold the membranes in position.

7. In dialytic apparatus, a cell comprising a skeleton frame having continuous side flanges, dialytic membranes lying against said flanges, endless clamping frames registering with said flanges, and means for securing said frames to the flanges to clamp the membranes in position.

8. In dialytic apparatus, a cell comprising a skeleton frame having continuous side flanges, dialytic membranes lying against said flanges, clamping members for securing the membranes in position, and cell supporting standards secured to said flanges.

9. In dialytic apparatus, a cell comprising a skeleton frame having continuous side flanges, dialytic membranes lying against said flanges, clamping members for securing the membranes in position, and lifting members attached to the flanges and projecting above the cell body.

10. In dialytic apparatus, a cell comprising a skeleton frame, a lateral dialytic membrane secured thereto, a sump in the bottom of the cell and a port in the top of the cell through which a clean-out pipe may be introduced into the sump.

In testimony whereof I have signed my name to this specification.

FRANK H. GRIFFIN.